United States Patent
Huang

(10) Patent No.: US 6,631,537 B1
(45) Date of Patent: Oct. 14, 2003

(54) BUCKLE DEVICE

(76) Inventor: Han-Ching Huang, No. 12, Alley 111, Lane 437, Ghen Hsing Road, Taichung (TW)

( * ) Notice: Subject to any disclaimer, the term of this patent is extended or adjusted under 35 U.S.C. 154(b) by 0 days.

(21) Appl. No.: 10/116,071

(22) Filed: Apr. 5, 2002

(51) Int. Cl.[7] ............................ A44B 11/25; A44B 21/00
(52) U.S. Cl. ............................ 24/193; 24/171; 24/196; 24/68 CD
(58) Field of Search ........................ 24/171, 191, 192, 24/193, 194, 196, 68 CD, 68 D, 68 R, 68 A, 68 E, 71 TD, 71 ST; 182/116

(56) References Cited

U.S. PATENT DOCUMENTS

| | | | | |
|---|---|---|---|---|
| 2,369,225 A | * | 2/1945 | George | 24/193 |
| 3,145,442 A | * | 8/1964 | Brown | 24/193 |
| 3,641,630 A | * | 2/1972 | Farley | 24/193 |
| 3,795,028 A | * | 3/1974 | Weiss | 24/191 |
| 4,395,796 A | * | 8/1983 | Akaura et al. | 24/68 CD |
| 4,796,336 A | * | 1/1989 | Scully | 24/68 CD |
| 4,951,365 A | * | 8/1990 | Loyd | 24/68 CD |
| 5,920,963 A | * | 7/1999 | Chou | 24/196 |
| 6,158,092 A | * | 12/2000 | Huang | 24/68 CD |

* cited by examiner

*Primary Examiner*—Victor Sakran
(74) *Attorney, Agent, or Firm*—Rosenberg, Klein & Lee

(57) ABSTRACT

A buckle device includes a body, a fastening element and a latch assembly. A first strap is secured to the body. The fastening element includes a rod formed thereon. The fastening element is mounted on the body so that it can be pivoted between a first position for allowing winding of a second strap around the rod and a second position for tensing up the second strap by means of the rod. The latch assembly can retain the fastening element in the second position. The body includes two side plates. The fastening element includes two side plates between which the rod is formed. A shaft is used to mount the fastening element on the body. The side plates of the body each define a hole for receiving the shaft. The side plates of the fastening element each define a hole for receiving the shaft. The latch assembly includes a latch mounted on the fastening element. Each of the side plates of the body includes a hook formed thereon for engagement with the latch when the fastening element is in the second position relative to the body. The latch includes two fins. Each of the side plates of the fastening element defines a slot for receiving one of the fins of the latch. An elastic element is connected between the fastening element and the latch for forcing the latch into engagement with the hooks when the fastening element reaches the second position relative to the body.

1 Claim, 7 Drawing Sheets

BUCKLE DEVICE

BACKGROUND OF INVENTION

1. Field of Invention

The present invention is related to a buckle device.

2. Related Prior Art

U.S. Pat. No. 6,158,092 issued to the applicant of the present patent application discloses a conventional buckle device. The conventional buckle device works well in securing two straps or two ends of a same strap in order to fasten objects. The conventional buckle device is however complicated in structure, i.e., consists of a lot of elements and therefore takes a long period of time to assemble and inevitably entails a high cost.

The present invention is therefore intended to obviate or at least alleviate the problems encountered in prior art.

SUMMARY OF INVENTION

It is an objective of the present invention to provide a buckle device that is simple in structure.

It is another objective of this invention to provide a buckle device that is inexpensive to manufacture.

In the present invention, a buckle device includes a body, a fastening element and a latch assembly. A first strap is secured to the body. The fastening element includes a rod formed thereon. The fastening element is mounted on the body so that it can be pivoted between a first position for allowing winding of a second strap around the rod and a second position for tensing up the second strap by means of the rod. The latch assembly is capable of retaining the fastening element in the second position relative to the body.

The body includes two side plates connected with each other by means of an intermediate plate. The fastening element includes two side plates connected with each other by means of an intermediate plate. The side plates of the fastening element are connected with the side plates of the body.

The rod is formed between the side plates of the fastening element.

The latch assembly includes a latch mounted on the fastening element. Each of the side plates of the body includes a hook formed thereon for engagement with the latch when the fastening element is in the second position relative to the body.

The latch can slide on the fastening element. The latch includes two fins projecting in opposite directions. Each of the side plates of the fastening element defines a slot for receiving one of the fins of the latch.

The latch assembly includes an elastic element connected between the fastening element and the latch for forcing the latch into engagement with the hooks when the fastening element reaches the second position relative to the body. The fastening element includes a retainer formed thereon, and the latch includes a retainer formed thereon. The elastic element is positioned between the retainer of the fastening element and the retainer of the latch.

Each of the hooks includes an inclined edge on which one of the fins slides when the fastening element is reaching the second position relative to the body, thus compressing the elastic element.

A shaft is used to mount the fastening element on the body. The side plates of the body each define a hole for receiving the shaft, and the side plates of the fastening element each define a hole for receiving the shaft. The shaft includes a first end formed with a head and a second end defining an annular groove for receiving a C-clip in order to retain the shaft in position.

Other objects, advantages, and novel features of the invention will become more apparent from the following detailed description when taken in conjunction with the accompanying drawings.

BRIEF DESCRIPTION OF DRAWINGS

The present invention is described through detailed illustration of embodiments referring to the attached drawings wherein.

DETAILED DESCRIPTION OF PREFERRED EMBODIMENTS

Figure 1:
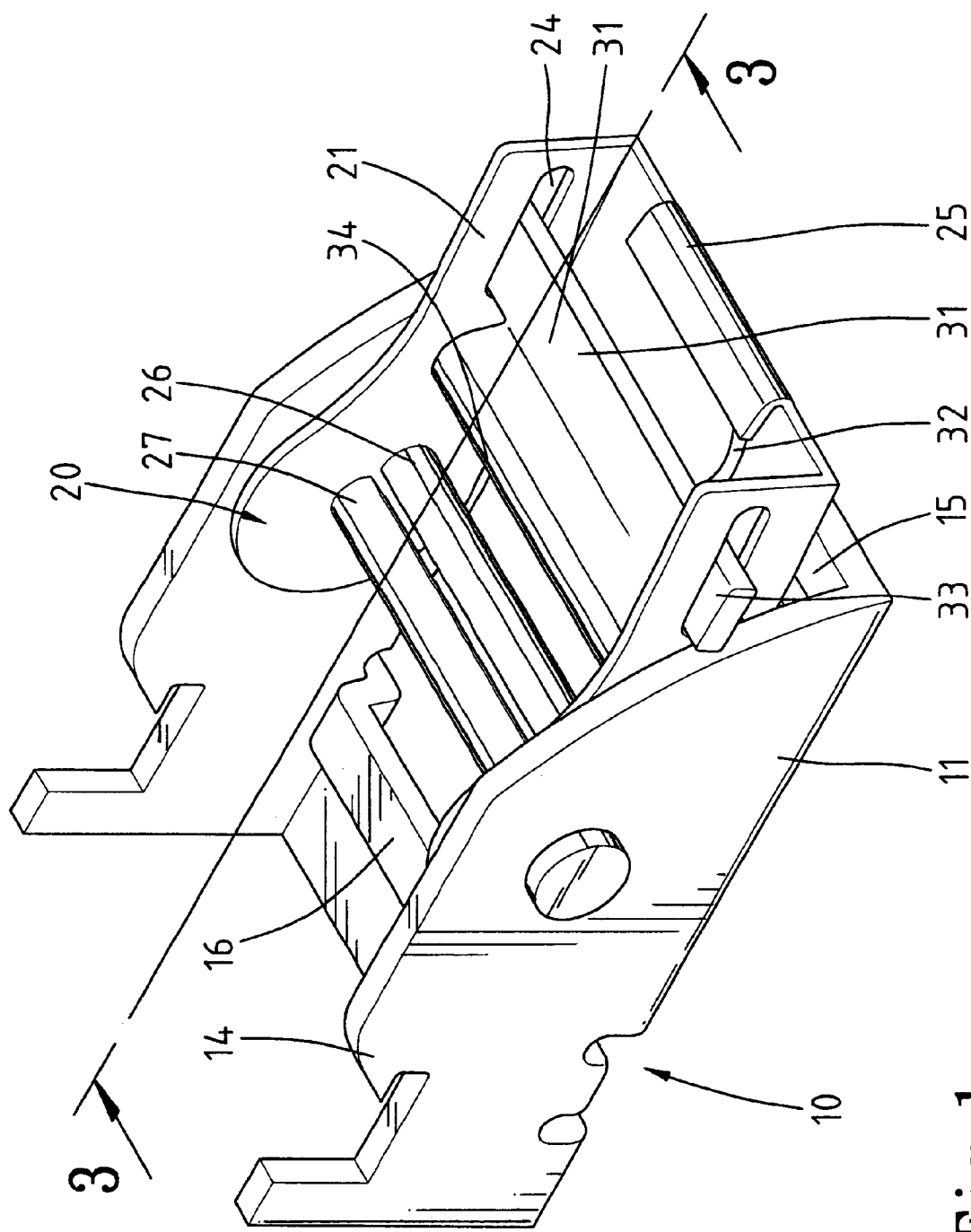
FIG. 1 is a perspective view of a buckle device according to a first embodiment of the present invention.
Figure 2:
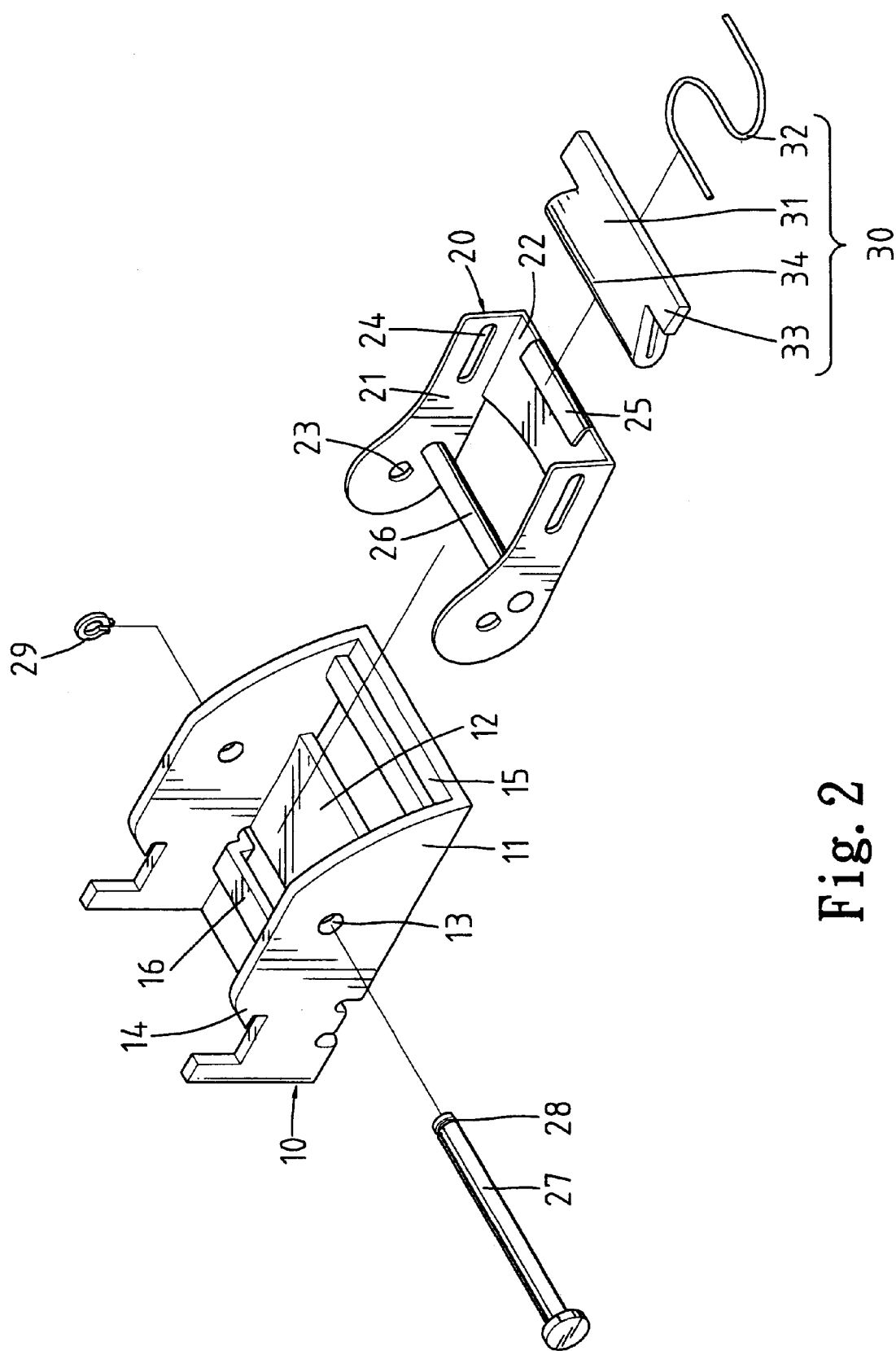
FIG. 2 is an exploded view of the buckle device of FIG. 1.

Referring to FIGS. 1 and 2, a buckle device according to a first embodiment of the present invention includes a body 10, a fastening element 20 and a latch assembly 30.

The body 10 includes two side plates 11 and an intermediate plate 12 for connecting the side plates 11 with each other. Each of the side plates 11 includes a hole 13 defined therein and a hook 14 formed thereon. The hook 14 formed on each of the side plates 11 includes an inclined edge. A bar 15 is formed between the side plates 11 so that it is separated from the intermediate plate 12. A second bar 16 is formed between the side plates 11 so that it is separated from the intermediate plate 12.

Figure 3:
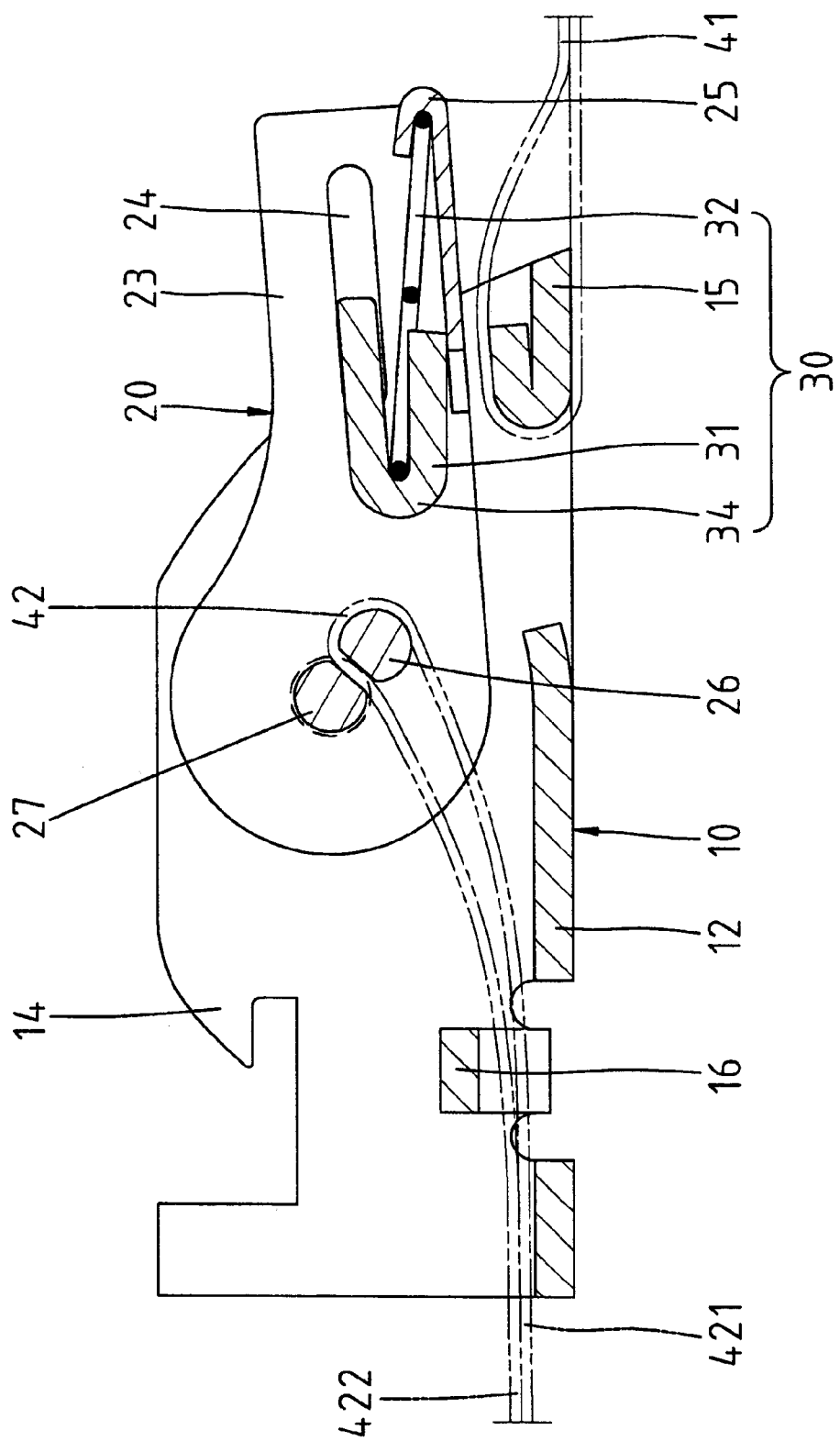
FIG. 3 is a cross-sectional view taken along a line 3—3 in FIG. 1
Figure 4:
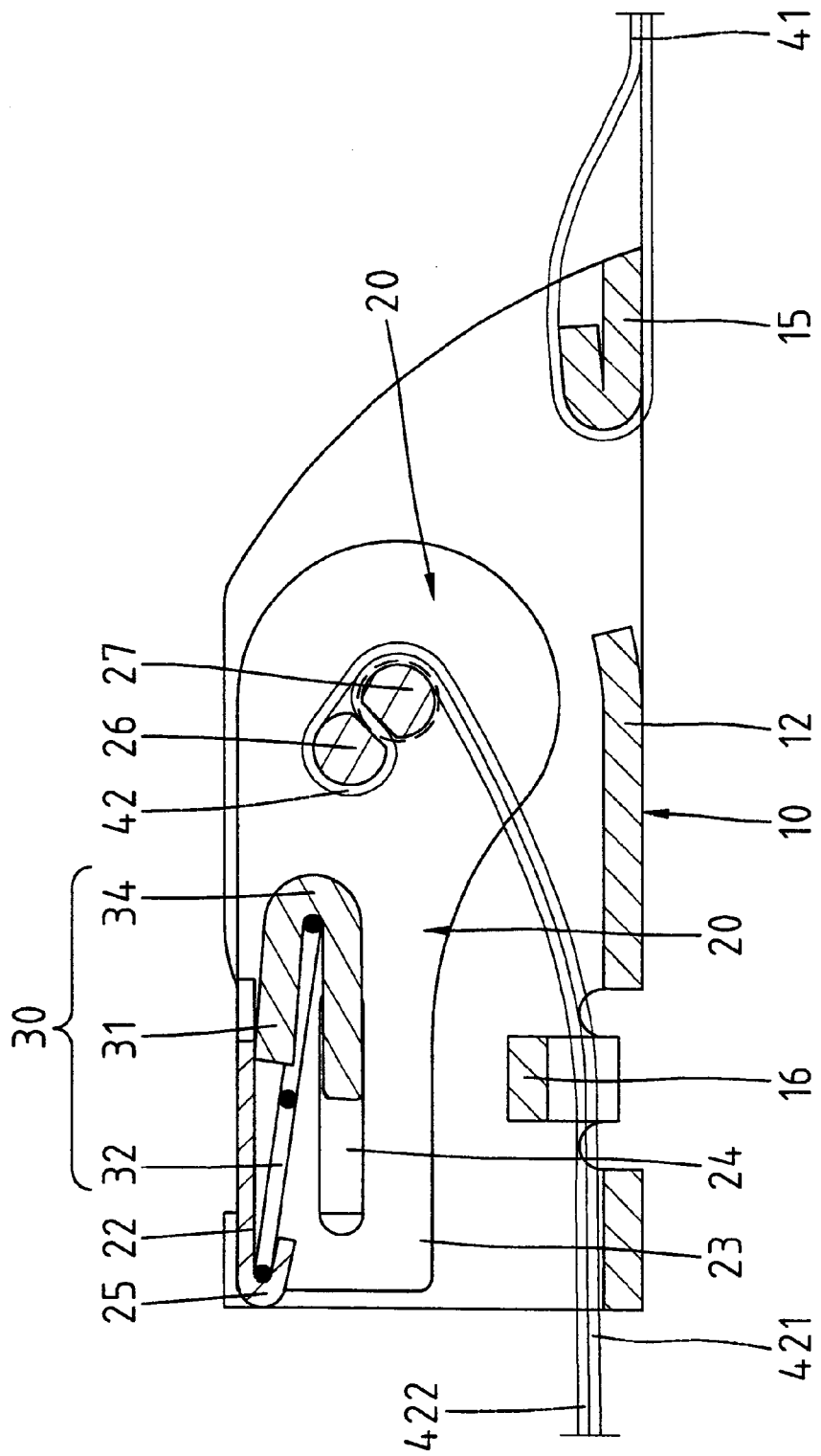
FIG. 4 is a view similar to FIG.3 but showing the buckle device in a second position.

The fastening element 20 includes two side plates 21 and an intermediate plate 22 for connecting the side plates 21 with each other. Each of the side plates 21 includes a hole 23 defined therein and a slot 24 defined therein. A retainer 25 extends in a direction from the intermediate plate 22 and then turns and extends in an opposite direction as seen in FIG. 3. A rod 26 is formed between the side plates 21. As best shown in FIGS. 3 and 4, the periphery of the rod 26 includes a cylindrical portion and a flat portion.

The latch assembly 30 includes a latch 31 and an elastic element 32. In the first embodiment, the elastic element 32 is an S-shaped spring. Two fins 33 extend in opposite directions from the latch 31. A retainer 34 extends in a direction from the latch 33 and then turns and extends in an opposite direction as seen in FIG. 3. In assembly, the side plates 21 of the fastening element 20 are positioned between the side plates 11 of the body 10 so that the holes 13 are aligned with the holes 23. A shaft 27 including an enlarged head and a tip is inserted through the holes 13 and 23 so that the fastening element 20 is pivotally mounted on the body 10. The flat portion of the rod 26 faces the shaft 27. An annular groove 28 is defined in the shaft 27 near the tip. A C-clip 29 is received in the annular groove 28. The shaft 27 is retained in position by means of the head thereof and the C-clip 29 mounted thereon.

The fins 33 are inserted in the slots 24, thus mounting the latch 31 on the fastening element 20 so that the latch 31 can slide relative to the fastening element 20. The fins 33 extend beyond the side plates 21. The elastic element 32 is compressed between the retainers 25 and 34 as seen in FIG. 3.

Referring to FIG. 3, the buckle device in according to the present invention can be used to securely connect a first strap 41 with a second strap 42. The numerals "41" and "42" may refer to two separate straps or two terminal sections of a same strap; however, they are used to represent two separate straps hereinafter for simplicity of description.

A terminal section of the first strap 41 is wound around the first bar 15 and then secured to another section of the first strap 41, thus securing the first strap 41 to the first bar 15.

A terminal section of the second strap 42 is inserted between the intermediate plate 12 and the second bar 16, and wound around the rod 26, and inserted between the rod 26 and the shaft 27, and then inserted between the intermediate plate 12 and the second bar 16 again. The terminal section of the second strap 42 is pulled until the strap 42 is tense. Then, the fastening element 20 is pivoted from a position shown in FIG. 3 to a position shown in FIG. 4. Thus, the second strap 42 is further pulled so that the strap 42 is further tensed up. Due to a large frictional force exerted on the second strap 42 by the rod 26 and a large frictional force exerted on the second strap 42 by the shaft 27, the tense in the second strap 42 is retained. Just before the fastening element 20 reaches the position shown in FIG. 4, the fins 33 slide on the inclined edges of the hooks 14, thus compressing the elastic element 32. Immediately after the fins 33 move past the inclined edges of the hooks 14, the elastic element 32 forces the fins 33 into engagement with the hooks 14.

Figure 5:
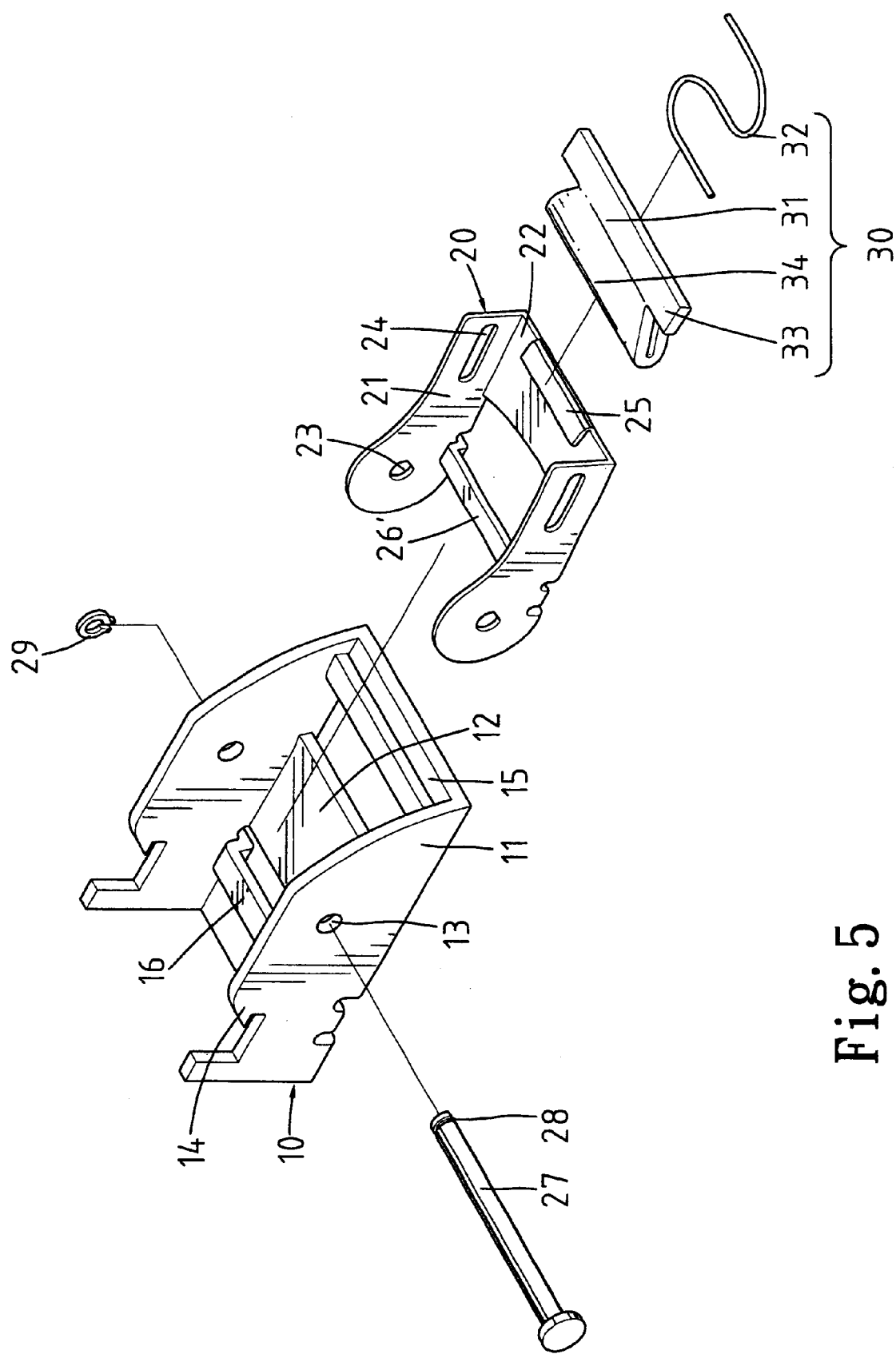
FIG. 5 is an exploded view of a buckle device according to a second embodiment of the present invention.

Referring to FIG. 5, a buckle device according to a second embodiment of the present invention includes a rod 26' formed between the side plates 21 of the fastening element 20 in place of the bar 26 of the buckle device according to the first embodiment of the present invention. Other elements of the second embodiment are identical to that of the first embodiment and therefore will not be described in detail.

Similar to the buckle device according to the first embodiment of the present invention, the buckle device according to the second embodiment of the present invention can be used to securely connect the first strap 41 with the second strap 42.

Figure 6:
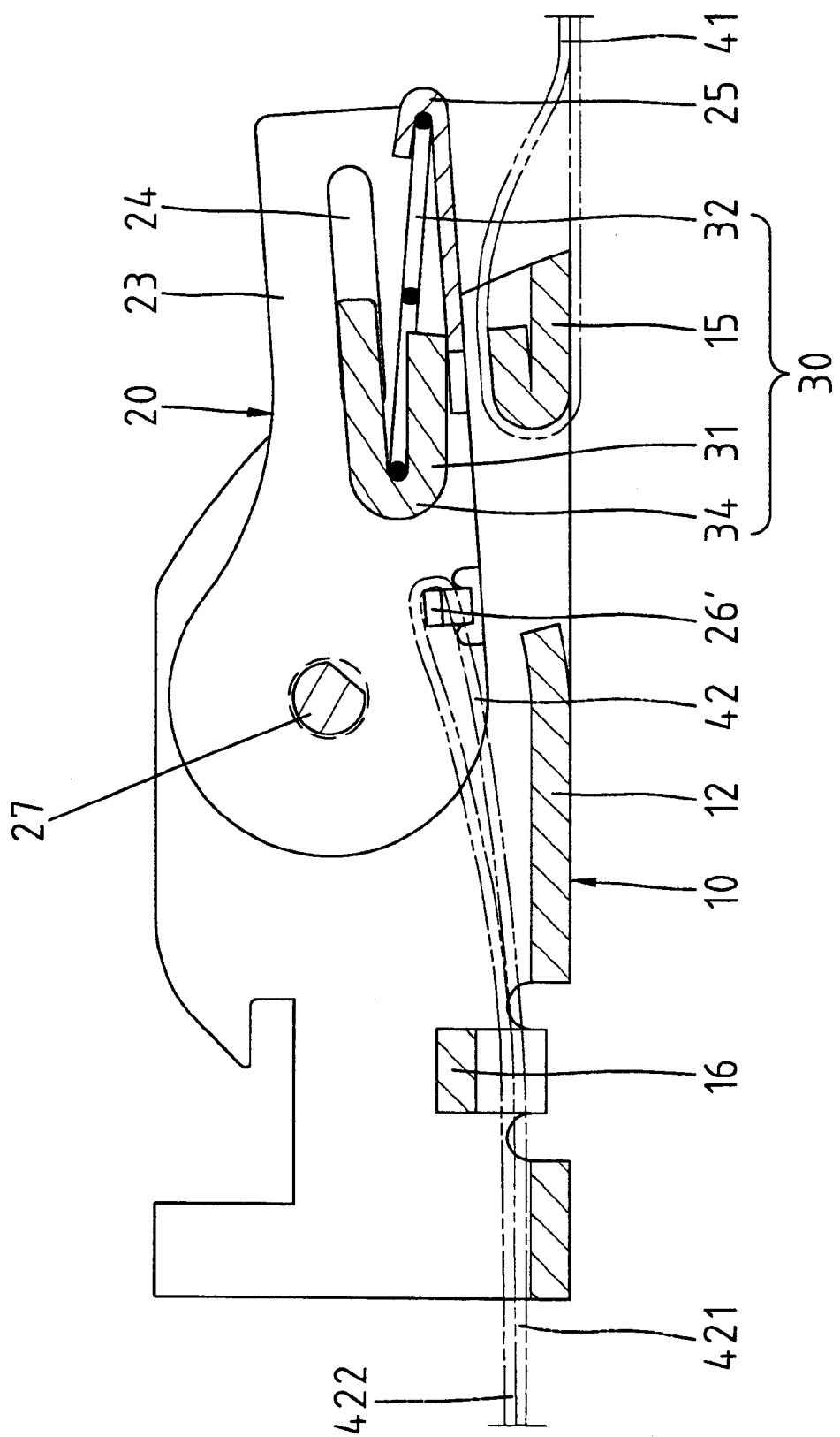
FIG. 6 is a cross-sectional view of the buckle device shown in FIG. 5.
Figure 7:
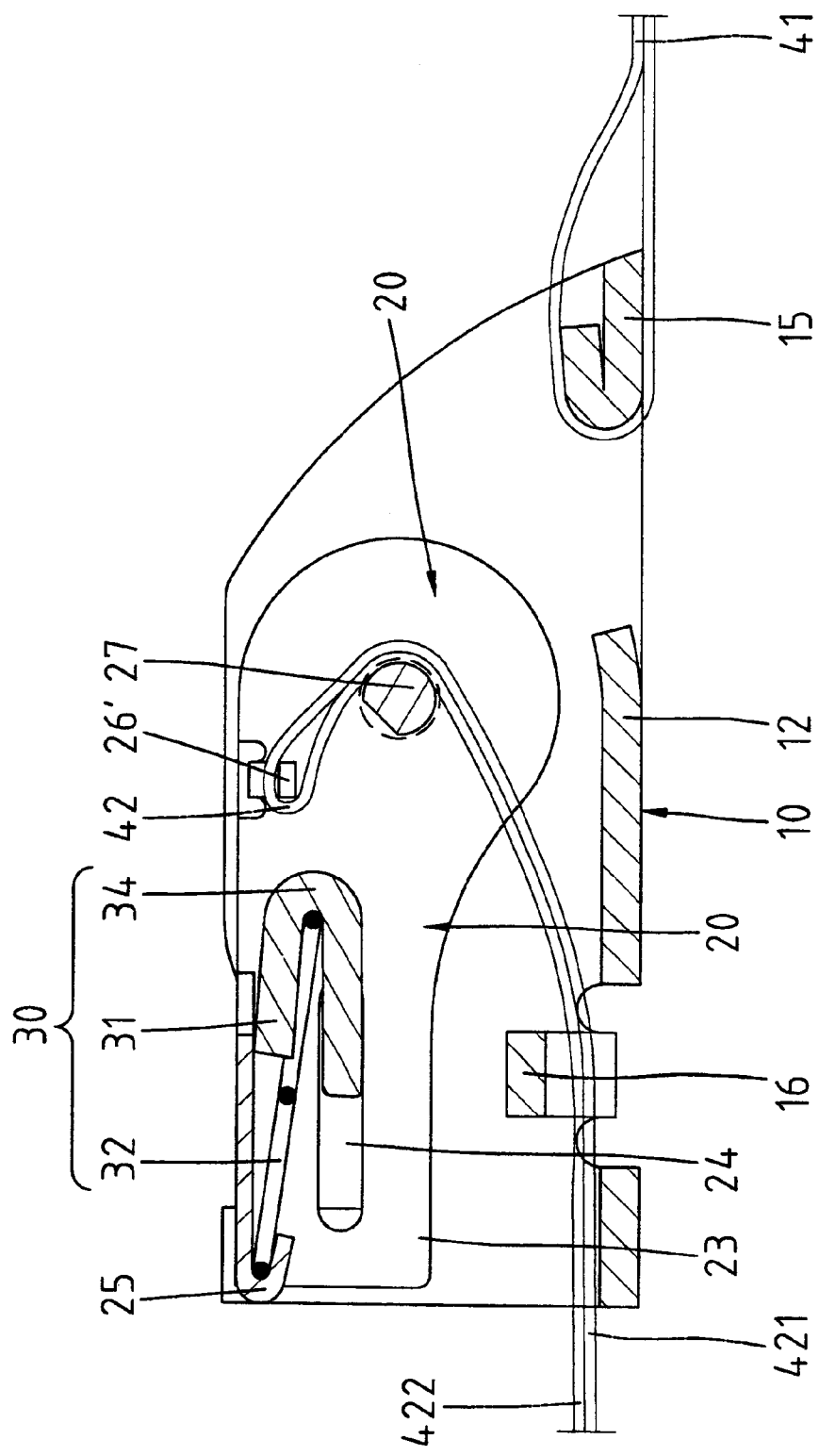
FIG. 7 is a view similar to FIG. 6 but showing the buckle device in a second position.

The terminal section of the second strap 42 is inserted between the intermediate plate 12 and the second bar 16, and wound around the rod 26, and then inserted between the intermediate plate 12 and the second bar 16 again. The terminal section of the second strap 42 is pulled until the strap 42 is tense. Then, the fastening element 20 is pivoted from a position shown in FIG. 6 to a position shown in FIG. 7. Thus, the second strap 42 is further pulled so that the strap 42 is further tensed up. Due to a large frictional force exerted on the second strap 42 by the rod 26' and a large frictional force exerted on the second strap 42 by the shaft 27, the tense in the second strap 42 is retained.

The preferred embodiment of the present invention has been described in detail for illustrative purposes. Those skilled in the art can derive a lot of variations from these embodiments after a study of this patent specification. Therefore, these embodiments shall by no means limit the scope of the present invention. The scope of the present invention can only be defined in the attached claims.

What is claimed is:

1. A buckle device comprising:

a body (10) for securing a strap (41) thereto, the body (10) includes two side plates (11) connected to each other by means of an intermediate plate (12), and the fastening element (20) includes two side plates (21) connected with each other by means of an intermediate plate (22), and the side plates (21) of the fastening element (20) are connected with the side plates (11) of the body (10);

a fastening element (20) including a rod (26, 26') formed thereon and extending between the side plates (21) the fastening element (20) being mounted on the body (10) so that it can be pivoted between a first position for allowing winding of a second strap (42) around the rod (26, 26') and a second position for tensing up the second strap (42) by means of the rod (26, 26'), the fastening element (20) including a retainer (25) formed thereon; and, a latch assembly (30) for retaining the fastening element (20) in the second position relative to the body (10), the latch assembly (30) includes a latch (31) slidably mounted on the fastening element (20), the latch (31) having a pair of fins (33) projecting in opposite directions, each of the side plates (11) of the body (10) including a hook (14) formed for engagement with the latch (31) when the fastening element (20) is in the second position relative to the body (10), each of the side plates (21) of the fastening element (20) having a slot (24) formed therein for receiving a respective one of the fins (33) of the latch (31), the latch (31) including a retainer (34) formed thereon, the latch assembly (30) including an elastic element (32) is positioned between the retainer (25) of the fastening element (20) and the retainer (34) of the latch (31) for biasing the latch (31) into engagement with the hooks (14) when the fastening element (20) reaches the second position relative to the body (10).

* * * * *